United States Patent [19]

Perslow

[11] Patent Number: 5,255,999
[45] Date of Patent: Oct. 26, 1993

[54] WATER-LEVEL CONTROL DEVICE
[75] Inventor: Johan A. Perslow, Seal Beach, Calif.
[73] Assignee: Space Biospheres Ventures, Oracle, Ariz.
[21] Appl. No.: 763,123
[22] Filed: Sep. 20, 1991
[51] Int. Cl.⁵ .............................................. E02B 7/00
[52] U.S. Cl. ......................................... 405/87; 405/52; 405/80
[58] Field of Search ................... 405/79, 52; 210/258; 137/150.5, 152

[56] References Cited

U.S. PATENT DOCUMENTS

| | | | |
|---|---|---|---|
| 1,810,981 | 6/1931 | Noble | 405/127 |
| 4,332,507 | 6/1982 | Wakamori et al. | 405/92 |
| 4,818,399 | 4/1989 | Midkiff | 210/258 X |
| 4,990,249 | 2/1991 | Levenberger | 210/258 X |
| 5,015,399 | 5/1991 | Eller | 210/258 X |
| 5,052,855 | 10/1991 | Chapman et al. | 405/127 X |
| 5,108,591 | 4/1992 | Hagan | 210/258 X |

FOREIGN PATENT DOCUMENTS

| | | | |
|---|---|---|---|
| 0068416 | 4/1984 | Japan | 405/127 |
| 0233010 | 12/1984 | Japan | 405/127 |

Primary Examiner—Dennis L. Taylor
Attorney, Agent, or Firm—Christie, Parker & Hale

[57] ABSTRACT

A water-level control device is provided for controlling water levels between a high-tide level and a low-tide level. The water-level control device comprises a tiltable pipe connected to a drain pipe by a flexible joint. Tilting of the pipe allows flow of water from a high-tide point to a low-tide point. Water is pumped into a pond continuously, and the variable-height weir cyclically varies the outflow to simulate a tidal cycle.

19 Claims, 4 Drawing Sheets

WATER-LEVEL CONTROL DEVICE

FIELD OF THE INVENTION

This invention relates to a closed ecological system including humans, which is completely isolated from the earth's environment insofar as transfer of matter is concerned. In particular, the invention relates to a method of creating tides within the manmade estuaries and an "ocean" within the closed ecological system.

BACKGROUND OF THE INVENTION

The earth comprises a biosphere in which microorganisms, plants, and animals, including humans, exist in a more-or-less steady state.

It is desirable to provide a microcosm of the biosphere known as earth to study the interaction of components and for development of techniques for influencing our environment. Such experiments are difficult at best in the open system provided on earth, since matter is exchanged between the earth's environment and the experiment. It is therefore desirable to provide a system that is completely enclosed, so that no matter is exchanged with the earth's environment.

Currently, a completely closed ecological system, referred to as Biosphere 2, is being established near Oracle, Arizona. The system completely encloses about one hectare of land and 175,000 cubic meters of space, isolated from the earth's environment by an impermeable skin so that no matter is transferred.

In an attempt to completely simulate the environs of earth, a saltwater "ocean" and an estuary have been included in Biosphere 2. The estuary is fed, upstream from fresh-water ponds and at a downstream point, by saltwater pumped from the ocean. This low-salinity water simulates tidal marshlands, which are fresh-water near their source but are of increasing salinity toward their ocean outlets. The Biosphere 2 marshlands provide a suitable ecosystem for the growth of numerous organisms which result in an accumulation of organic materials which build up in the marshlands environment. This organic material can provide a source of nutrition for organisms in the saltwater ocean.

To disperse the nutrients, a tide is simulated. High tide in the ocean is low tide in the marsh, and vice versa, as water is caused to flow back and forth between these biomes. After high tide, resulting from the gradual accumulation of water pumped into the marshlands, the water is allowed to flow from the marshlands to the ocean, thus providing nutrients to the ocean organisms. When low tide is reached, the water level is again allowed to rise in the marshlands, which allows the accumulation of more organic material and nutrients. In addition to providing nutrients to the ocean life, the tides also provide a suitable ecosystem for the growth of the tidal organisms of the marshlands which require the cyclical high and low tides for their survival.

The method for tide creation in the oceans and estuaries of the world is through the gravitational influence of the moon. In Biosphere 2, the lunar influence is minimal, and the ocean and estuary tides must be simulated by manmade means.

SUMMARY OF THE INVENTION

The present invention relates to a water-level control device which can be used to simulate tides. The water-level control device comprises a tiltable pipe, a tilt connector, and a drain pipe attached to the tilt connector. A means for tilting the pipe between an upper level and a lower level is provided. The tilting of the pipe is programmable so that the tides generated simulate the ebb and flow of the natural tides.

BRIEF DESCRIPTION OF THE DRAWINGS

The features and advantages of the present invention will be better understood when considered with reference to the following detailed description and the accompanying drawings, where.

DETAILED DESCRIPTION

Figure 1:
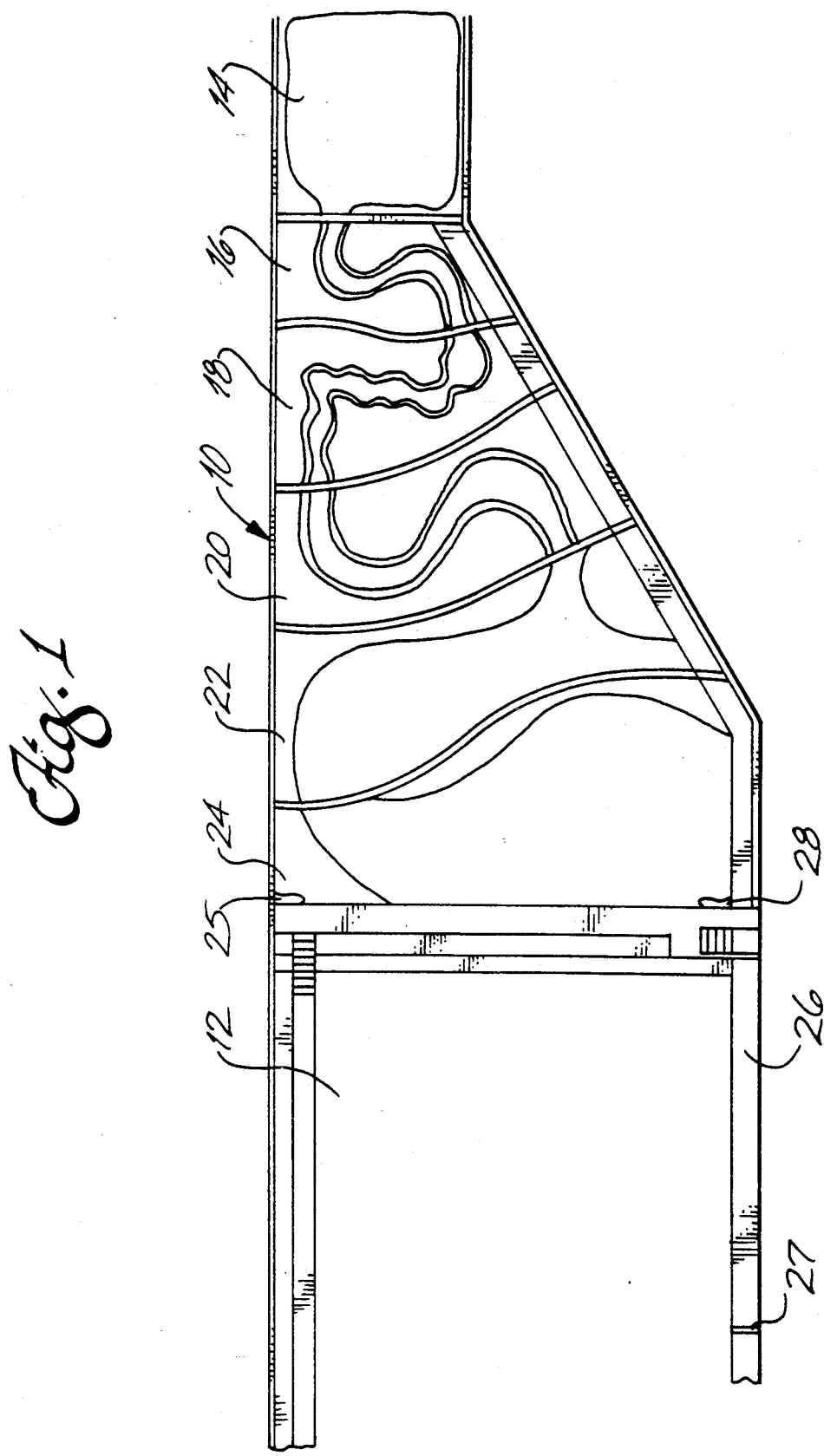
FIG. 1 is a perspective view of an estuary and ocean region within Biosphere 2.

FIG. 1 shows the general layout of an estuary or marshlands 10 (also referred to as the "second tidal reservoir" or the "second tidal pond") and an ocean 12 (also referred to as the "first tidal reservoir" or the "first tidal pond") in Biosphere 2.

Tides, which result in varying salinity in the marshlands, are created in the marshlands to simulate the tides that occur in nature. Such tides are important for the establishment of aquatic ecosystems suitable for the growth of a wide variety of organisms. To create the tides, fresh water is continually added to the estuary from a fresh-water pond 14, which is at the highest elevation in the estuary, at 4.42 m relative to an arbitrary datum for Biosphere 2. The fresh water flows downstream, i.e., downhill, from the fresh-water pond, to an oligohaline marsh 16, then, in turn, to a salt marsh 18, a black mangrove marsh 20, an oyster bay 22, and finally to a red mangrove marsh 24, which is at the lowest elevation in the marshlands, at 3.66 m Saltwater is also continually added to the marshlands by pumping ocean water into the red mangrove marsh, via a pump 25. The saltwater mixes with the water in the red mangrove marsh, and, as the water level rises, a salt gradient is created. The red mangrove marsh has the highest salt concentration in the marshlands, and the oligohaline marsh has the lowest salt concentration.

Each of the marsh regions is separated by a wall, each of which has a weir depression that is preset to retain the low-tide water level, i.e., the depression in the wall is at a height that will determine the low-tide level within each of the regions of the marshlands. The depressions also allow water inflow into each of the regions when the preset height or level of its weir depression is exceeded by the incoming tide. For example, the low-tide level is 3.66 m in the red mangrove, 3.96 m in the oyster bay, 4.04 m in the black mangrove marshlands, 4.11 m in the salt marshlands, and 4.19 m in the oligohaline marshlands. At high tide (spring tide) in the marshlands, the level of the water is 4.27 m At this high-tide level, water will rise through all the marshlands, including the oligohaline marsh. It is only at "spring tide," when the water level is at its highest, that saltwater will be introduced to the elevation of the oligohaline marsh.

When the marshlands are experiencing a spring tide of 4.27 m, the ocean is at its low-tide (neap tide) level of 3.43 m At low tide in the marshlands, the water level is 3.66 m at the same time the ocean is at its high-tide level of 3.66 m.

High tide in the marshlands is created by inhibiting the flow of water out of the marshlands and by continually adding water to the marshlands. When high tide in the marshlands has been reached, water is released from the marshlands and flows across a "crabwalk" 26, where the high nutrient level of the water is diluted before it is finally allowed to enter the ocean. The crabwalk is a partitioned area which runs most of the length of the ocean and which is open to the ocean at its end 27. Since it is open to the ocean, it contains water from the ocean, which acts to dilute the water as it is released from the marshlands.

The dilution of the water released from the marshlands is important, since it is high in nutrients such as nitrogen. The nitrogen concentration of the water released from the marshlands can be as high as 20 ppm. While this water is a valuable source of nutrients for much of the wildlife in the ocean, the very high concentrations can prove toxic to some of them. Therefore, it is important to lower concentrations of these nutrients to acceptable levels. Dilution of the nutrients in the water from the marshlands is achieved by mixing water from the marshlands with the ocean water present in the crabwalk. In addition, water from the crabwalk is processed through "scrubbers" which remove nutrients and particulate matter from the water. Intakes and outlets for these scrubbers are also located in the crabwalk.

When low tide in the marshlands is reached, the flow from the marshlands is inhibited, and the water level is once again allowed to rise. In an exemplary embodiment, water from the ocean is pumped into the marshlands at a rate of about 680 l/min. The outflow is the same when the tide level is unchanging (for example, at high tide), is lower when the tide level is rising, and is larger when the tide level is falling.

Figure 2:
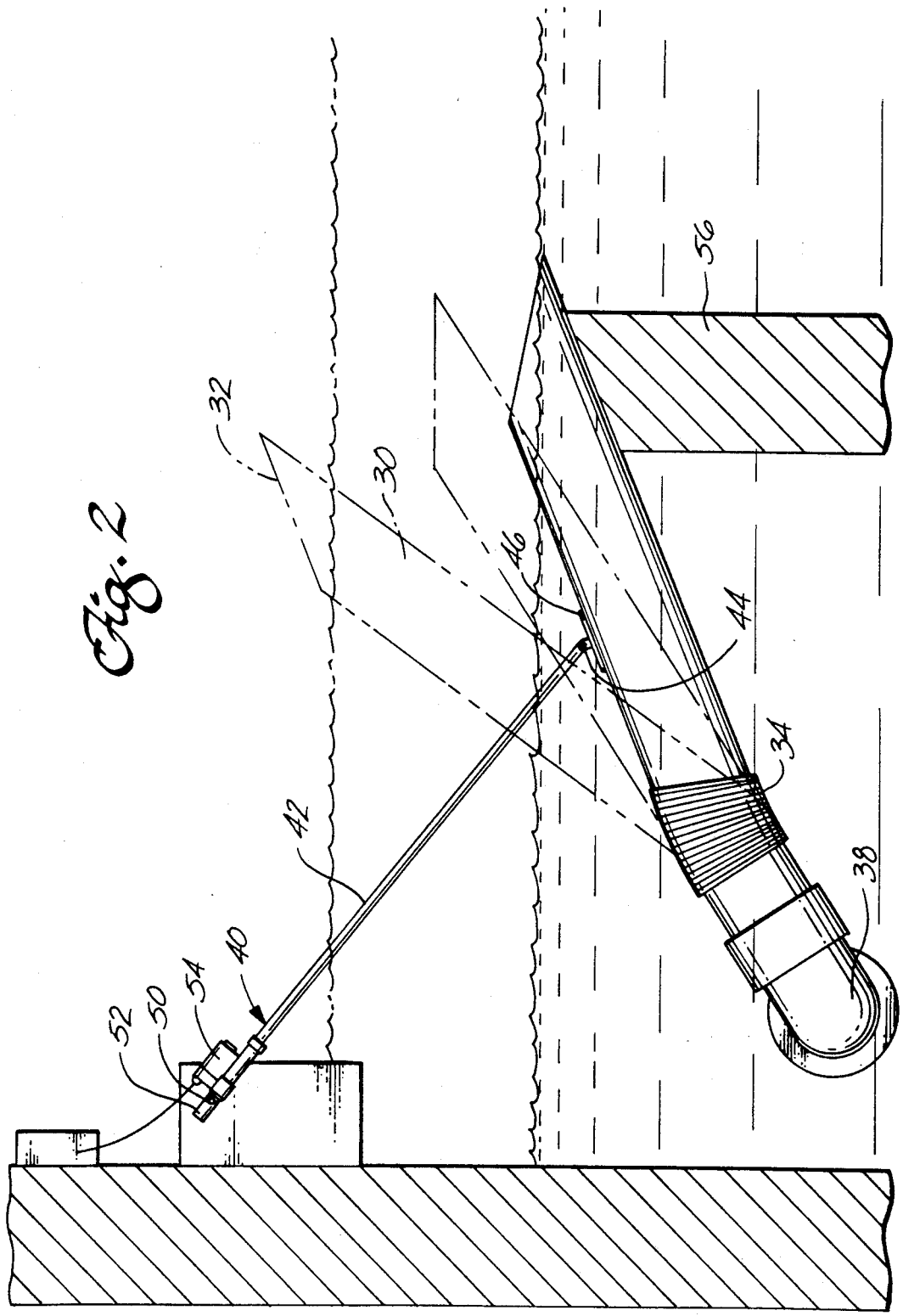
FIG. 2 is a semi-schematic side view of a water-level control device with a diagonal cut end.

The flow from the marshlands, and therefore the tides, is regulated by a water-level control device 28 located in the red mangrove marsh, adjacent to the ocean. A semi-schematic side view of the water-level control device is shown in FIG. 2. The water-level control device incorporates a tiltable pipe 30, which, in one embodiment, has a diagonal open upper end 32, through which water from the marshlands can flow. The diameter of the tiltable pipe is about 25 cm. This wide-diameter pipe allows a large weir (approximately 76 cm) over which water can flow. This large weir perimeter is increased by the inclusion of the diagonally-cut end on the pipe.

To allow the tiltable pipe to be tilted, it is connected to a tilt connector 34. A bellows-like flexible tilt connector, constructed of plastic, is preferred, since it requires no relatively-movable parts that can wear, corrode, or become fouled. The tilt connector can be formed as an integral part of the tiltable pipe. This type of construction also allows the advantage of eliminating the possibility of leaks developing at joints. The lack of seams or joints also eliminates, or reduces, the accumulation of material that can eventually lead to clogging or fouling of the pipe, which would result in a failure of the tides. In the event of such a failure, nutrients would not be transferred to the ocean, and the organisms which are dependent on these nutrients for their existence would likely perish.

The tilt connector is, in turn, connected to a drain pipe 38, which directs the flow of water from the marshlands into the crabwalk. Since the drain pipe, the tiltable pipe, and the tilt connector are in contact with saltwater, it is preferred that they are composed of a non-corrodible material, such as polyethylene, PVC, or other suitable material.

The tiltable pipe allows the water level of the marshlands to be lowered by allowing flow from the marshlands to the ocean when the diagonal open upper end of the tiltable pipe is lowered below the high-tide level in the marshlands. Water flows into the diagonal open upper end, down the tiltable pipe, through the drain pipe, into the crabwalk, and out into the ocean. When the tiltable pipe is tilted, the diagonal open upper end is at a horizontal position at the mean tide level and offers its largest weir perimeter for water flow at this point. When the tiltable pipe is tilted either up or down, the perimeter of the tiltable pipe over which water can flow is reduced and, in turn, results in a reduction in the flow rate of water to the crabwalk.

Figure 3:
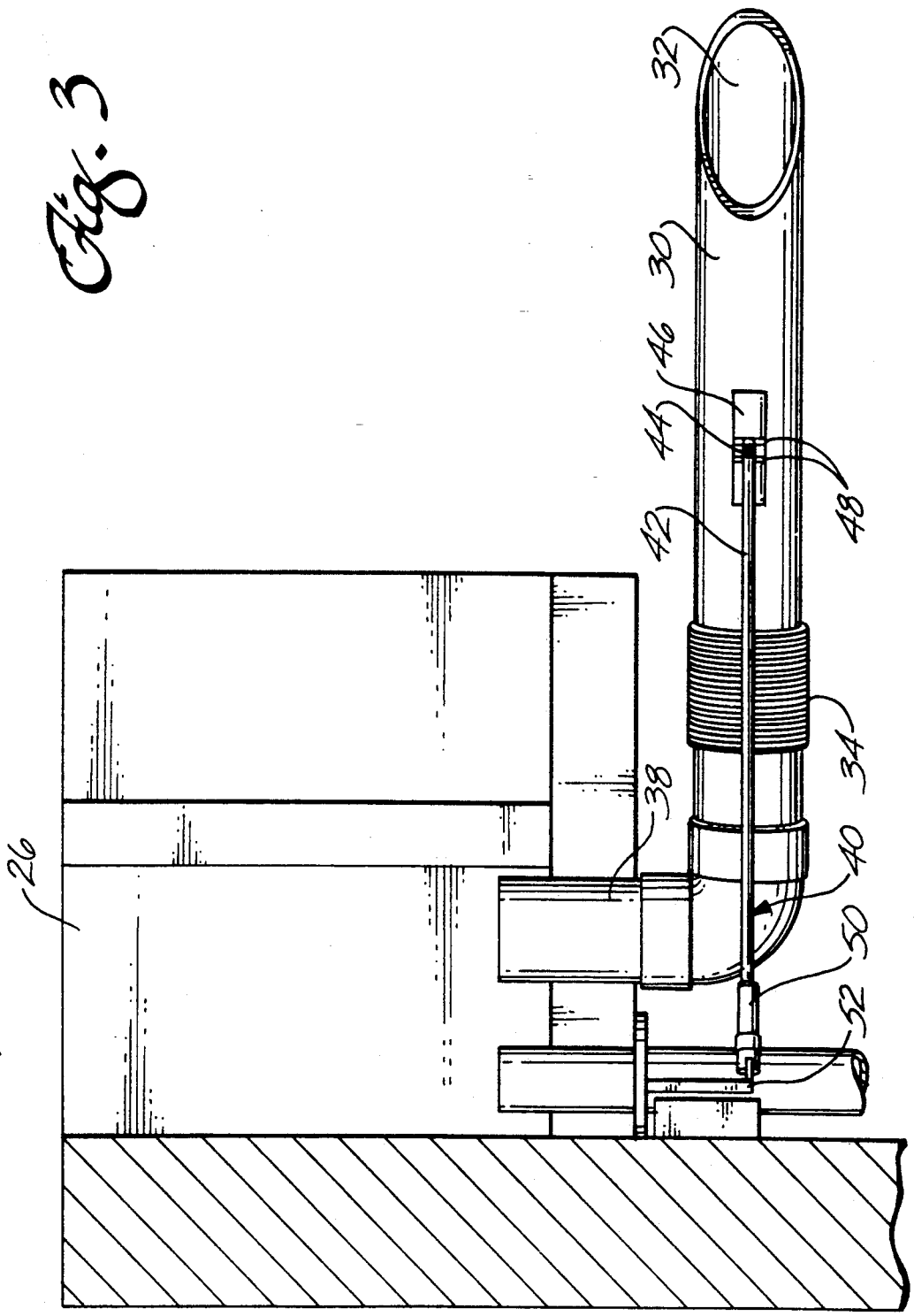
FIG. 3 is a semi-schematic top view of a water-level control device with a diagonal cut end.

Tilting the tiltable pipe can be achieved by a tilting mechanism 40, which is composed of an actuator shaft 42 connected at one end to the upper side of the tiltable pipe. In one embodiment, the connection, shown in FIG. 3, is a clevis 44 attached to the actuator shaft, with the clevis connected to a pipe mount 46. The pipe mount is attached to the upper side of the tiltable pipe by bolts 48 on the outside of the tiltable pipe and nuts (not shown) on the inside of the tiltable pipe, or by gluing.

The other end of the actuator shaft is connected by a second clevis 50 which, in turn, is connected to an actuator wall mount 52, as shown in FIG. 3.

Figure 4:
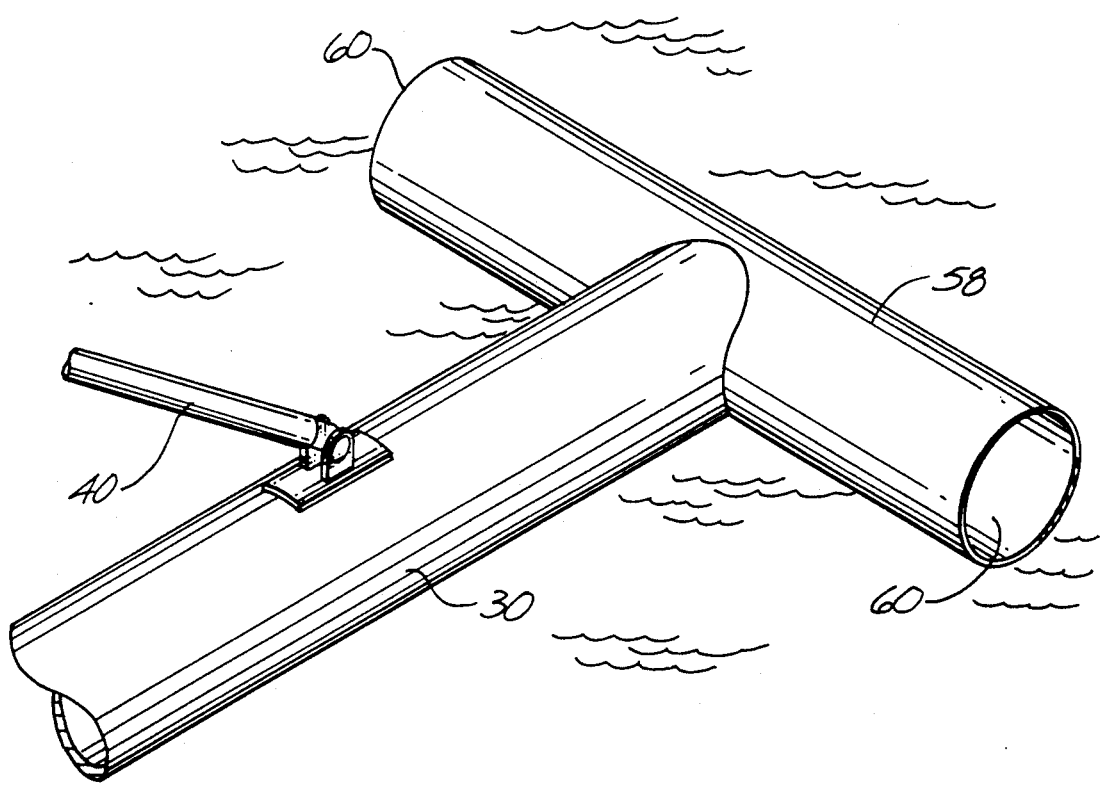
FIG. 4 is a semi-schematic side view of a water-level control device with a T-shaped end.

In an alternate embodiment, shown in FIG. 4, the water-level control device incorporates a T-shaped upper end 58. The diameter of the T-shaped upper end has a diameter of about 25 cm. This wide opening allows a large weir over which water can flow. This weir is increased by the inclusion of two openings 60 at each end of the "T". The "T" is oriented so that the arms of the "T" are horizontal. The tiltable pipe allows the water level of the marshlands to be lowered by allowing flow from the marshlands to the ocean when the T-shaped upper end of the tiltable pipe is lowered below the high-tide level in the marshlands. Water flows into each end of the T-shaped upper end, down the tiltable pipe, through the drain pipe, into the crabwalk, and out into the ocean.

The wide diameter of the tiltable pipe of both embodiments described herein is an important feature of the water-level control device, since it allows small animals,, such as crabs, to have access to both the marshlands and the ocean. Animals such as crabs require the different ecosystems that are established in saltwater oceans and marshlands for feeding and also for breeding. Therefore, it is important that these animals, if they are to flourish, be able to gain access to both of these environments. The wide diameter of the tiltable pipe allows the animals, such as crabs, to crawl through the pipe. In addition to allowing the animals to crawl through the pipe, the wide diameter of the pipe also results in a gentle flow of water, rather than a "waterfall," through the pipe. If a waterfall were created in the pipe, it could result in damage to any animals that were to crawl through at the time when the tides were in the process of changing and water was being reintroduced into the ocean.

Tides are created and regulated by the actions of a programmable stepping motor 54 connected to the wall mount. The programmable stepping motor can be programmed so that its action, in raising and lowering the tiltable pipe, will simulate natural tidal cycles over a 28-day period, i.e., a lunar month. In natural environments there are two high and low tides within a lunar day (24 hours, 51 minutes). It is therefore desirable to provide two high and low tides within Biosphere 2. In Biosphere 2, the maximum water-level displacement between high and low tides is two feet. However, in natural environs, the tidal variation each day is not at maximum displacement. Instead, the tidal displacement varies throughout the month, with maximum high displacement (spring tide) and maximum low displacement (neap tide) only being reached about once a month. The tides at other times of the month are at lower displacements.

The tides within Biosphere 2 are set to simulate natural tidal displacement throughout the 28-day lunar month. In addition to the requirement of two tides per lunar day, it is desirable that the tides also resemble the tidal amplitude changes or displacements of natural tides that vary throughout the lunar month. For example, at the beginning of the month, the tidal amplitude can be close to its maximum of one foot above the mean tide at high tide and one foot below the mean tide at low tide. However, as the lunar month progresses, the amplitude may be as little as zero displacement from the mean tide for the high or the low tide. At the end of the 28-day lunar month, the amplitude would again be at its maximum, completing the monthly cycle. The stepping motor is programmed to simulate these desired tidal changes.

The changes in the amplitudes of the tides and the times of high and low tides are desirable to foster the growth of tidal organisms, since the "biological clocks" of these organisms are timed to coincide with these natural rhythms. Duplicating this environment allows the organisms to flourish by coordinating the rhythms of the organisms and promoting natural symbiotic relationships between the organisms.

The tiltable pipe is tilted from the high-tide position to the low-tide position. At the maximum low-tide position (at the time of a neap tide), the tiltable pipe cones to rest on a block 56 that acts as a "rest" or a "stop" for the tiltable pipe. The block prevents further unintended and excessive downward motion of the tiltable pipe.

During the tidal cycle, water is being cycled from the ocean to the marshlands and back again. In addition, fresh water is continually being added from the freshwater pond to the marshlands and, hence, to the ocean. To prevent the ocean from "overflowing," water is removed from the ocean and desalted. This water can then be used as a fresh-water supply, where needed, throughout Biosphere 2.

The present invention is described in relation to only two embodiments and is for illustration purposes. Variations will be apparent to those skilled in the art. For example: The tiltable pipe may be tilted by a rotatable crank, the rotation of which is controlled to simulate a desired tidal cycle; the tilt connector may be an elbow-and-swivel joint; the tiltable pipe may be as simple as a flexible hose, the open upper end of which is cyclically raised and lowered to act as a variable-height weir. Therefore, the present invention is not intended to be limited to the embodiment described above. The scope of the invention is defined in the following claims.

What is claimed is:

1. A water-level control device comprising:
   a diagonally-tiltable pipe having an open upper end;
   a tilt connector at a lower end of the tiltable pipe;
   a drain pipe attached to the tilt connector;
   an actuator shaft connected to an upper portion of the drain pipe; and
   means for retracting and extending the actuator shaft for cyclically tilting the pipe between an upper level and a lower level, respectively.

2. A water-level control device as claimed in claim 1, wherein the means of tilting the pipe comprises a stepping motor connected to the actuator shaft.

3. A water-level control device as claimed in claim 1, wherein the upper end of the pipe comprises a side arm extending laterally from the length of the tiltable pipe.

4. A water-level control device as claimed in claim 1, wherein the upper end of the pipe comprises a "T", connected to the tiltable pipe and having arms extending horizontally.

5. A water-level control device as claimed in claim 1 comprising a means for programming the tilting of the pipe to simulate a natural tidal action.

6. A water-level control device as claimed in claim 1, wherein the tilt connector comprises a flexible section of conduit between the tiltable pipe and the drain pipe.

7. A water-level control device as claimed in claim 1, wherein the upper end of the pipe comprises a diagonal cut.

8. A water-level control device as claimed in claim 7, wherein the diagonal-cut upper end is horizontal near a mid-level between the upper and lower levels.

9. A method gradually raising and lowering an overflow weir in accordance with a desired tidal cycle for simulating a tidal cycle in a first pond simulating an ocean and in a second pond simulating a marshland tidal estuary comprising:
   continually pumping water from the first pond to a portion of the second pond; and
   returning the water from the second pond to the first pond at a variable rate.

10. A method tilting an overflow pipe with an open upper end between a high-tide elevation and a low-tide elevation for simulating a tidal cycle in a first pond simulating an ocean and in a second pond simulating a marshland tidal estuary comprising:
    continually pumping water from the first pond to a portion of the second pond; and
    returning the water from the second pond to the first pond at a variable rate.

11. A method as claimed in claim 10, wherein the step of tilting comprises the step of bending a flexible potion of the pipe adjacent to its lower end.

12. A method for simulating a tidal cycle in a first pond simulating an ocean and in a second pond simulating a marshland tidal estuary comprising simulating high tide in the first pond while simulating low tide in the second pond, and vice versa by continually pumping water from the first pond to a portion of the second pond; and
    returning the water from the second pond to the first pond at a variable rate.

13. A tidal simulator comprising:
    a first tidal reservoir;
    a second tidal reservoir;
    means for continually pumping water from the first tidal reservoir to the second tidal reservoir;
    means for periodically varying the rate of return of water from the second tidal reservoir to the first tidal reservoir; and means for controlling the periodicity for returning the water to the first tidal reservoir.

14. A tidal simulator as claimed in claim 13, wherein the means for periodically returning water to the first tidal reservoir comprises a variable-height weir.

15. A tidal simulator as claimed in claim 14, wherein the variable-height weir comprises a tiltable pipe.

16. A tidal simulator as claimed in claim 15, wherein an upper end of the pipe comprises a "T" connected to the tiltable pipe and having arms extending horizontally.

17. A tidal simulator as claimed in claim 15, wherein the tilt connector comprises a flexible section of conduit between the tiltable pipe and a drain pipe.

18. A tidal simulator as claimed in claim 15, wherein an upper end of the pipe comprises a diagonal cut.

19. A tidal simulator as claimed in claim 13, wherein the means for controlling the periodicity of returning the water to the first tidal reservoir comprises a programmable stepping motor.

* * * * *